(12) United States Patent
Kim et al.

(10) Patent No.: US 9,260,223 B2
(45) Date of Patent: Feb. 16, 2016

(54) REVERSIBLY DEFORMABLE INTERACTIVE PACKAGE COMPONENTS

(71) Applicant: Nestec, SA, Vevey (CH)

(72) Inventors: Kisun Kim, St. Louis, MO (US);
Stephen A. Wurth, St. Louis, MO (US);
Bethanie L. Gasperson, Edwardsville, IL (US); Jacob H. Ballard, St. Louis, MO (US); James P. Persells, St. Louis, MO (US); Christopher Graham Tuttle, St. Louis, MO (US); Kate Elizabeth Jente, Clayton, MO (US)

(73) Assignee: Nestec S.A., Vevey (CH)

( * ) Notice: Subject to any disclaimer, the term of this patent is extended or adjusted under 35 U.S.C. 154(b) by 106 days.

(21) Appl. No.: 13/947,492

(22) Filed: Jul. 22, 2013

(65) Prior Publication Data

US 2014/0027324 A1    Jan. 30, 2014

Related U.S. Application Data

(60) Provisional application No. 61/675,076, filed on Jul. 24, 2012, provisional application No. 61/856,095, filed on Jul. 19, 2013.

(51) Int. Cl.
*B65D 73/00* (2006.01)
*B65D 25/00* (2006.01)
*B65D 81/36* (2006.01)

(52) U.S. Cl.
CPC ............... *B65D 25/00* (2013.01); *B65D 81/36* (2013.01); *B65D 2203/00* (2013.01); *B65D 2203/12* (2013.01)

(58) Field of Classification Search
CPC combination set(s) only.
See application file for complete search history.

(56) References Cited

U.S. PATENT DOCUMENTS

| 3,142,409 | A | * | 7/1964 | Ross | 220/281 |
| 3,545,760 | A | * | 12/1970 | Wilson | 473/588 |
| 4,152,863 | A | * | 5/1979 | Kubiatowicz | 446/486 |
| 5,334,079 | A | * | 8/1994 | Gentile et al. | 446/486 |
| 5,695,086 | A | * | 12/1997 | Viola | 220/287 |

(Continued)

FOREIGN PATENT DOCUMENTS

FR     2 731 679 A1    9/1996
GB     2 412 365 A     9/2005

OTHER PUBLICATIONS

International Search Report & Written Opinion for PCT/US2013/051460 dated Oct. 30, 2013.

(Continued)

*Primary Examiner* — Jacob K Ackun
(74) *Attorney, Agent, or Firm* — Ronald A. Burchett; Julie M. Lappin

(57) ABSTRACT

Disclosed herein are packages for consumer goods that provide additional functionality as an interactive device for encouraging playful interaction with the package contents. In various embodiments, the package includes a lid or top comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid. Kits and methods for using the interactive packages and particularly the interactive portions of the packages are also disclosed.

23 Claims, 11 Drawing Sheets

(56) References Cited

U.S. PATENT DOCUMENTS

| | | |
|---|---|---|
| 5,797,815 A | 8/1998 | Goldman et al. |
| 6,684,819 B1 * | 2/2004 | Locke .......................... 119/707 |
| 7,641,052 B2 * | 1/2010 | Calendrille, Jr. ............... 206/779 |
| 2006/0213453 A1 * | 9/2006 | Conrady ....................... 119/707 |
| 2008/0289297 A1 * | 11/2008 | Tsang ........................... 53/167 |
| 2009/0314221 A1 * | 12/2009 | Wang ............................ 119/707 |
| 2010/0136875 A1 * | 6/2010 | Buynak et al. .................. 446/73 |
| 2011/0088292 A1 * | 4/2011 | Kay et al. ................... 40/124.02 |

OTHER PUBLICATIONS

English abstract of FR 2731679.

* cited by examiner

1

REVERSIBLY DEFORMABLE INTERACTIVE PACKAGE COMPONENTS

BACKGROUND OF THE INVENTION

1. Field of the Invention

The invention relates generally to packages, and particularly to package components that function as interactive devices for encouraging playful interaction with the package contents.

2. Description of Related Art

Packages for consumer goods are generally useful for containing, transporting, and protecting the package contents. After most packages are opened, the package contents are used for their intended purposes, and the packages are discarded. Even packages that are designed to be reused are typically resealed to protect an unused portion of the package contents and the packages are discarded after all of the package contents have been used.

Some packages, however, attempt to serve functions other than merely containing, transporting, and protecting the contents. U.S. Pat. No. 5,334,079 discloses a toy having flexible shell for launching projectiles. U.S. Pat. No. 4,152,863 discloses a popper toy for launching items. US20110088292A1 discloses packaging that includes an illumination system and audio system that purports to make the contents more appealing to consumers. US20100136875A1 discloses packaged toys with selectors for "try-me" type packaged toys. U.S. Pat. No. 7,641,052 discloses display packaging for animated toys that facilitates demonstration of the toy's features. US20080289297A1 discloses an interactive toy package for toy vehicles that operates the toy when engaged by the consumer.

Such packages may adequately function for their intended purposes, which, in addition to containing, transporting and protecting the contents, include displaying the product at a point of sale such as a retail store. However, there is a need for new interactive packages that provide functionality after the sale and throughout the life of the package and its contents. There is, therefore, a need for packages that permit consumers or users to engage in playful activities using the package contents.

SUMMARY OF THE INVENTION

It is, therefore, an object of the present invention to provide interactive packages or package components adapted for allowing consumers to engage in playful activities with the package contents after the sale of the package.

It is another object of the invention to provide interactive food packages or food package components that permit the user to engage in playful activities with the food before and during consumption of the food.

It is a further object of the invention to provide interactive animal food packages or animal food package components that bridge the gap between inedible "toys" and edible "treats" and which permit the user to engage a companion animal in playful activities with the treats before and during consumption of the treats.

It is yet another object of the present invention to promote the health or wellness of an animal using an interactive package that promotes healthful interactions and playtime between a human and companion animal.

It is yet a further object of the present invention to provide a package of goods, where at least a component of such package provides such interaction and where such component can be re-used with additional non-interactive packages containing similar goods.

One or more of these or other objects are achieved by providing interactive packages and package components (e.g., package lids or packages having a lid) that are formed as a container lid or top comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its original (undeformed) shape, the springing action propels the item away from the lid. One or more of these or other objects are further achieved by providing kits and methods for using the interactive packages and particularly the interactive portions of such packages. Other and further objects, features, and advantages of the present invention will be readily apparent to those skilled in the art.

BRIEF DESCRIPTION OF THE DRAWINGS

FIG. 1 shows embodiments of an interactive package lid comprising a hollow body defined by a reversibly deformable domed shell having launching area.

FIG. 2 illustrates an alternative embodiment of an interactive package lid in cross section. The interactive package lid features a body in which the shell is not entirely deformable, but has a reversibly deformable launching station (rather than the entire shell being reversibly deformable as in FIG. 1) for launching or propelling an item such as an animal treat.

FIG. 7 depicts an embodiment of the interactive package lid and package in which the launching station and ornamentation together form the features of a fanciful animal head, with the "nose" being a launching station. The user depresses the launching station "nose," then places an object (such as a pet treat) in the launching station. FIG. 7B is a perspective view of the same embodiment as shown in FIG. 7A, with the reversibly deformable launching station in the act of springing back to its original shape, thereby launching the object into the air. FIG. 7C is a perspective view of an interactive package comprising the lid of FIG. 7A, wherein the bottom portion (not shown) is inserted into a second lid assembly that snaps over and seals the container.

FIG. 8 depicts an embodiment inf the invention comprising a trigger/release mechanism.

FIG. 9 depicts an embodiment of the interactive package and package lid for use with pet treats. FIG. 9C is a top view; FIG. 9D is a perspective view; FIG. 9E is a side view and FIG. 9F is a front view of the interactive package lid.

DETAILED DESCRIPTION OF THE INVENTION

Definitions

Figure 1A:
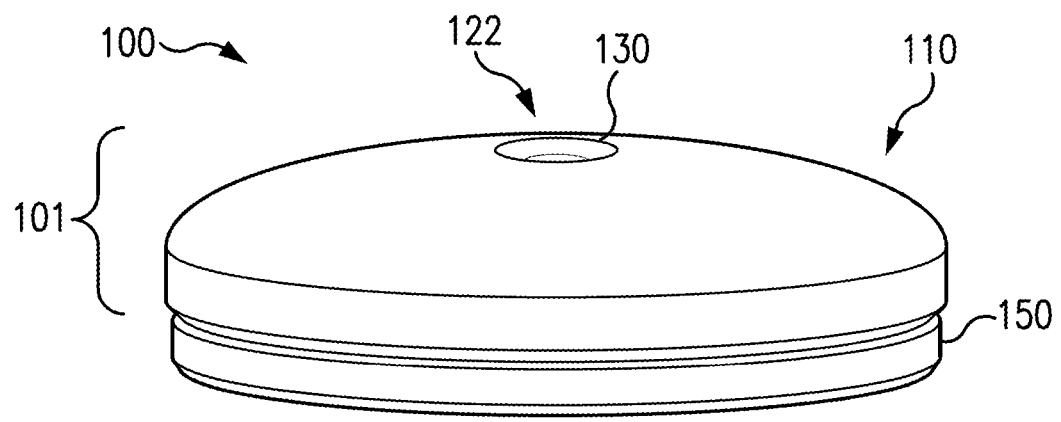
FIG. 1A is a perspective view depicting the shell in its undeformed state.

The term "animal" means any animal that could benefit from an interactive package of the invention, including human, avian, bovine, canine, equine, feline, hicrine, lupine, murine, ovine, or porcine animals, and preferably a domesticated animal, and more preferably a companion animal.

The term "companion animal" means domesticated animals such as dogs, cats, birds, rabbits, guinea pigs, ferrets, hamsters, mice, gerbils, pleasure horses, cows, goats, sheep, donkeys, pigs, and more exotic species kept by humans for company, amusement, psychological support, education, physical assistance, extrovert display, and all of the other functions that humans desire or need to share with animals of other species. The term "companion animal" also means a dog or a cat.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual components physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

The terms "interactive package," "interactive package lid," "interactive lid," "interactive top," "interactive package component," and the like mean that a package, or a component thereof, such as the lid, is adapted to be used for propelling or launching an item such as a food product, a snack, an animal treat, a toy, a part, or the like in connection with a fun activity such as play, a game, or the like to encourage interaction of a consumer with the contents of a package after purchase and even after the contents of the initial package have been used or consumed. The interactive portion of the package can be used apart from the rest of the package. For instance, where the lid is the interactive portion it may be used for its interactivity while disconnected away from the container that contains the package contents. Thus, an interactive package lid can be used on a table or on the floor or other surface during play, and then returned to the container thereafter.

As used interchangeably herein, a package "lid" or "top" can be a closure for a package, or can be designed for assembly together with a closure for a package. The closure attaches to a container that holds the package contents by any means known for package construction, including by snap-on, screw-on, press-on, rest-on, or the like, such that the lid lies entirely to the outside of the container. The lid or top can also snap-in, screw-in, rest-in, press-in or the like such that at least some portion of the lid or top lies to inside of the container. For interactive packages, some or all of the interactivity features can reside within the lid or primarily within the lid portion of the package. In a preferred embodiment herein, the interactive functionality is embodied in the package's lid, and such lids can be re-used, e.g., fitted into or onto other containers, such as refills and the like, which themselves could be interactive or non-interactive. Thus, a consumer may not need to purchase the interactive portion of the package each time the contents (e.g. consumables) are used up. This provides a savings to consumers, to the manufacturers, and is a more environmentally friendly manufacturing practice. In one embodiment, one or more aspects of the interactive functionality reside in the package lid or top, while other functionality resides with the container or another component of the package.

The term "reversibly deformable" is used to indicate a property of a material an object or a construction that when the material, object or construction is deformed, i.e., depressed or compressed, it springs back to its original or undeformed shape. For purposes here, such materials, objects or constructions can be described as having 'shape memory'. Reversibly deformable materials can have their shape changed (e.g. by stretching or deforming) but will automatically return to their original or undeformed shape. The timing of the return may be immediate or delayed. However, the return to the undeformed state should be fast enough or sudden enough to impart enough force to launch or propel an object in contact with the reversibly deformable region during the transition from fully deformed shape to the original or undeformed shape. This sudden return from the deformed shape to the original shape is sometimes referred to herein as "springing" or "popping."

The term "health and/or wellness of an animal" means the complete physical, mental, and social well being of the animal, not merely the absence of disease or infirmity.

As used herein, ranges are used herein in shorthand, to avoid having to list and describe each and every value within the range. Any appropriate value within the range can be selected, where appropriate, as the upper value, lower value, or the terminus of the range. As used herein, the singular form of a word includes the plural, and vice versa, unless the context clearly dictates otherwise. Thus, the references "a", "an", and "the" are generally inclusive of the plurals of the respective terms. For example, reference to "a compound" or "a method" includes a plurality of such "compounds" or "methods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context.

The terms "comprising" or "including" are intended to include embodiments encompassed by the terms "consisting essentially of" and "consisting of". Similarly, the term "consisting essentially of" is intended to include embodiments encompassed by the term "consisting of".

The methods and compositions and other advances disclosed here are not limited to particular methodology, protocols, and reagents described herein because, as the skilled artisan will appreciate, they may vary. Further, the terminology used herein is for describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by applicable law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides an interactive lid suitable for use as a component of an interactive package. The lid comprises a hollow body defined by a flexible shell, wherein the shell is reversibly deformable or comprises regions that are reversibly deformable. The lid is adapted for launching or propelling an item when the item is placed on the shell or on a reversibly deformable region of the shell, wherein when the shell is deformed and thereafter springs back to its undeformed shape, the springing action propels the item away from the lid.

As will be understood more fully by the description that follows, functionality of the interactive package is achieved from a combination of one or more of material type, material thickness and geometry. In various embodiments described herein, the material is a thermoplastic elastomer with rubber-like qualities. Without intending to limit the invention by any explanation of mechanism, when the deformable portion is inverted, the molecules are stretched or elongated. The elastomeric material tends to return to its original condition, thereby initiating the springing action referred to above.

Packages are an important part of any consumer product and in some cases the consumer may interact passively with the package more so than the product which is contained therein. The invention is based upon the discovery that by providing packages or package components with interactivity, consumers not only make better use of the package, but also can enjoy the products contained in the package in new ways that are likely to promote the health and wellness of the consumer and others that interact with the package.

The invention provides interactive packages and package components that allow consumers to interact with one or more contents of the package, and with other persons and/or animals, e.g. an animal owner or caregiver interacting in a playful way with the animal. The packages generally comprise an interactive component that allows a user to interact in a playful manner with the package contents. In various embodiments, the interactive package comprises an interactive lid or top which is adapted to launch or project one or more items of the package contents in a game or fun challenge. The package contents are generally small items, parts, pieces, or the like. In one embodiment, the package contents are consumable, such as a food or snack or treat. In another embodiment, the package contents are non-consumable, such as a collection of small toys.

Figure 1B:
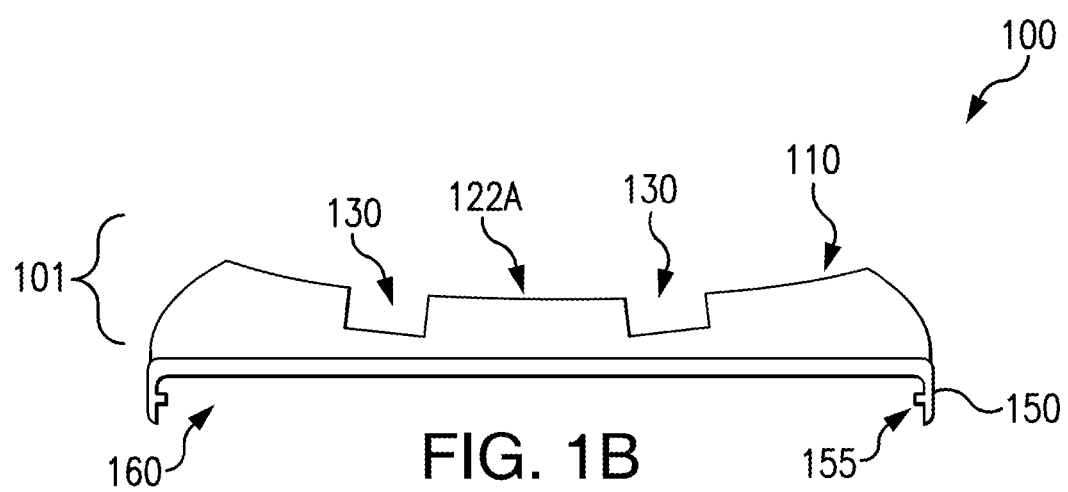
FIG. 1B shows a cross-section of the same embodiment of the interactive package lid of FIG. 1A in a fully deformed state.

Referring to FIG. 1, FIG. 1A and FIG. 1B show an embodiment 100 of an interactive package lid 101. The interactive lid 101 comprises a reversibly deformable material such that the lid springs back to its original or undeformed state after it is deformed. The lid 101 is adapted for launching or propelling an object from a package (not shown) into the air. A domed shell 110 of the interactive lid 101 includes one or more launching areas 130, which may comprise an indentation or depression of the shell 110. The interactive lid 101 includes a sealing component 150, which may be present as a snap-on, fit-in, or other means of sealing a container (not shown). The sealing component as shown in FIG. 1A and FIG. 1B is a snap-on type lid comprising a sealing bead 155 and defining a space 160. FIG. 1A shows the interactive lid 101 in an undeformed shape. Note the position of point 122 on the lid. The lid shell 110 may be of any useful or convenient shape (including a simple dome or pyramidal shape). An object to be launched is placed in or on the launching station 130. The interactive lid may be deformed by pressing down on the lid, for example at point 122 on the shell 110. FIG. 1B shows the same embodiment in the fully deformed state. Note the dome position 122 on the shell 110 has been displaced to position 122*a*. After a period of about one second to about 30 seconds, the shell 110 reversibly springs back to its original undeformed shape. The force of the return of the shell 110 to its original shape (i.e., the dome at position 122) is sufficient to launch or propel the object into the air.

Figure 1C:
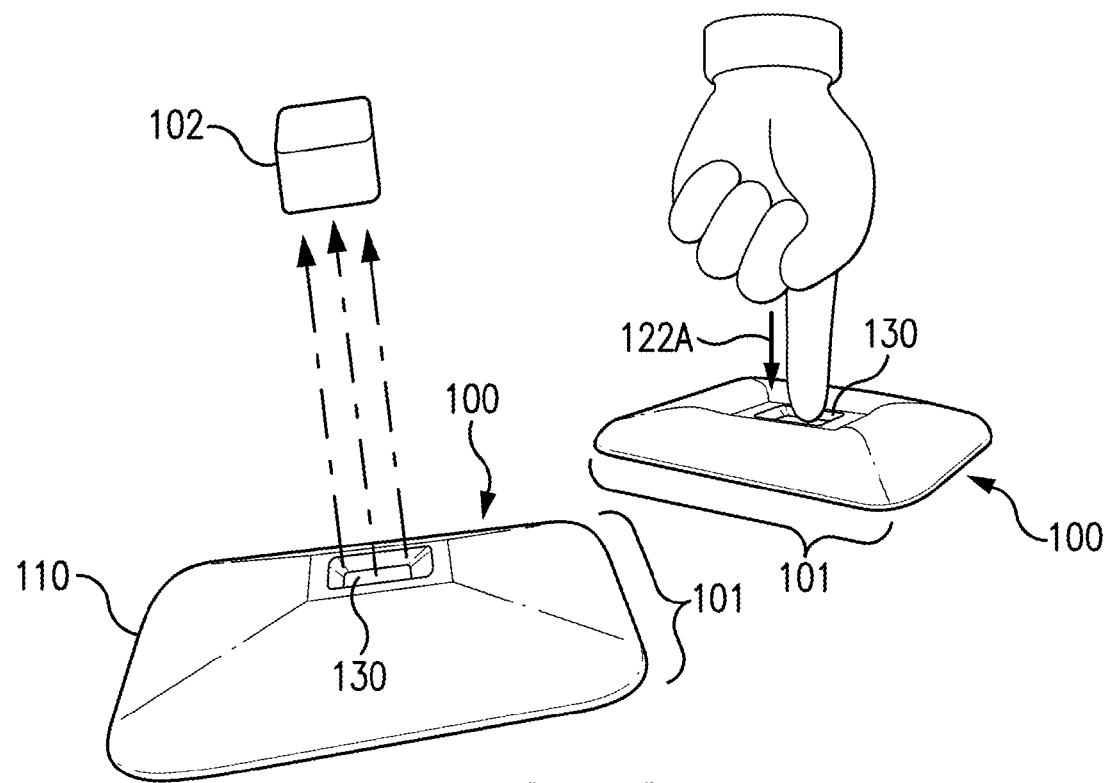
FIG. 1C is a perspective view of an alternative embodiment of an interactive lid in action. The top diagram shows the act of pressing on the shell to deform it, after which an item is placed into the launching station and the shell thereafter springs back to its original (undeformed) shape, and in so doing, propels the item from the launching station.

FIG. 1C shows an alternative embodiment 100 of an interactive package lid 101 in action. The shell 110 is deformed by pressing down on the lid until the dome of the shell 110 has been displaced to position 122*a*. An object 102 is placed into launching station 130. Either immediately or after a delay, which can range from one second to several seconds, the deformed shell 110 springs back to its original shape, thereby launching or propelling the object 102 from the launching station 130 into the air (as shown by the arrows).

Figure 1D:
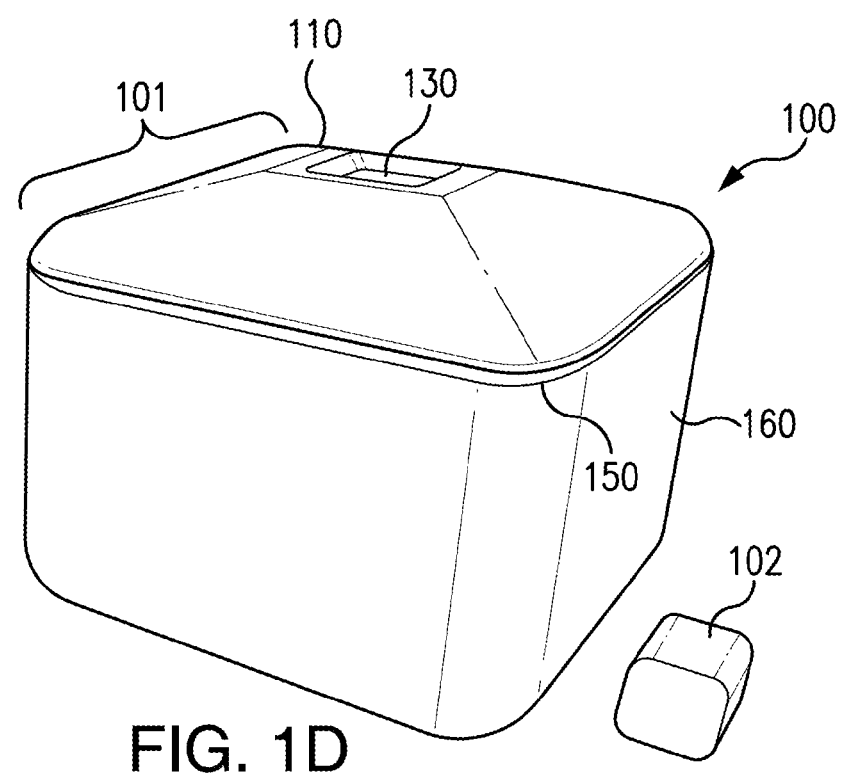
FIG. 1D is a perspective view of the interactive lid shown in FIG. 1C, placed onto and sealing a container that holds the items to be launched. In this embodiment, unlike that of FIG. 1A, the seal is not a snap-on construction, but instead fits inside the container.

FIG. 1D shows the interactive package lid of FIG. 1C inserted into a container 160 holding objects 102 suitable for use with the interactive lid 101. Lid 101 has a sealing component 150 comprising a ridge that fits snugly inside container 160, rather than the snap-on type of seal shown in FIG. 1A and FIG. 1B.

As will be discussed more fully below, preferably the object to be launched is a food item, such as an animal treat or a snack for a human. The interactive lid 101 may be a lid for package of animal treats and provides a mean of improving a human's relationship with a companion animal. The regular use of the interactive lid 101 can be the basis of enriching playtime, which improves the health or wellness of the animal.

The skilled artisan will appreciate that the interactive lid 101 has a shape memory and further that there is no movement in the launching area or station independent of the shell 110. In contrast, a further aspect of the invention can be better understood with reference to FIGS. 2 to 4 and 6 to 10. In this aspect, only the launching stations or portions thereof need to be reversibly deformable. The remainder of the shell may comprise any materials useful for the requirements of the package (e.g., containing, protecting, transporting, and delivering the package contents). Moreover, the launching area or station has shape memory and can be reversibly deformed independently of whether the shell or remainder of the body of the lid is deformable.

Figure 2A:
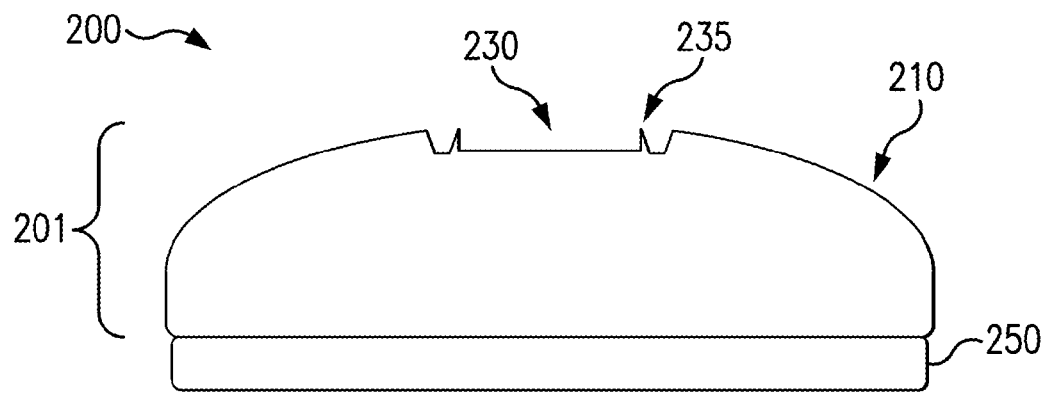
In FIG. 2A, the launching station is shown in the undeformed state.
Figure 2B:
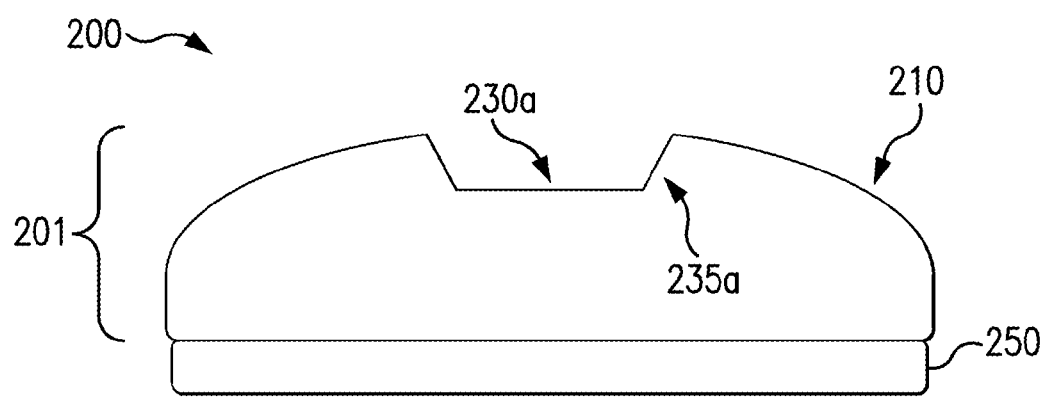
FIG. 2B shows another cross-section of the same interactive lid embodiment where the launching station in the fully deformed state.

With reference to FIG. 2, an embodiment of an interactive package suitable for permitting a user to engage in playful activities launching or propelling the package contents is shown in cross-section. FIG. 2A shows the cross-section of an interactive package lid 201 in its undeformed shape. In this state, it can be seen that lid 201 features a sealing component 250, and a body 201 with shell 210. The shell 210 includes one or more launching stations 230, each of which feature a launching connector 235 between the launching station 230 and the body 201 or shell 210. The launching connector 235 and optionally the launching station 230 are reversibly deformable. In such embodiments, the shell 210 and remainder of the interactive lid 201 need not be reversibly deformable. Such an arrangement may allow more options for package design, and choice of cost-effective and suitable materials for all components of the interactive package. The skilled artisan will appreciate that the launching station 230 in the undeformed state can be flush with the surface of shell 210, can be an indentation in the shell 210, or can extend outward from the shell 210. In embodiments where a launching station extends out from the shell, a depression located therein may aid in retaining the object to be launched (see, e.g., object holder 434 in FIG. 4). Moreover, the object to be launched can be placed in or on the launching station 230. FIG. 2B shows the same embodiment of an interactive package lid 201 in the fully deformed state. As can be seen, launching station 230 has been shifted to position 230*a*, while the launching connector 235 has been deformed to area 235*a*. A suitable object placed in launching station 230 will be launched or propelled into the air when the launching station springs back to its original shape/state. The return to the original shape generally occurs after a time delay, as discussed in more detail below.

Figure 3:
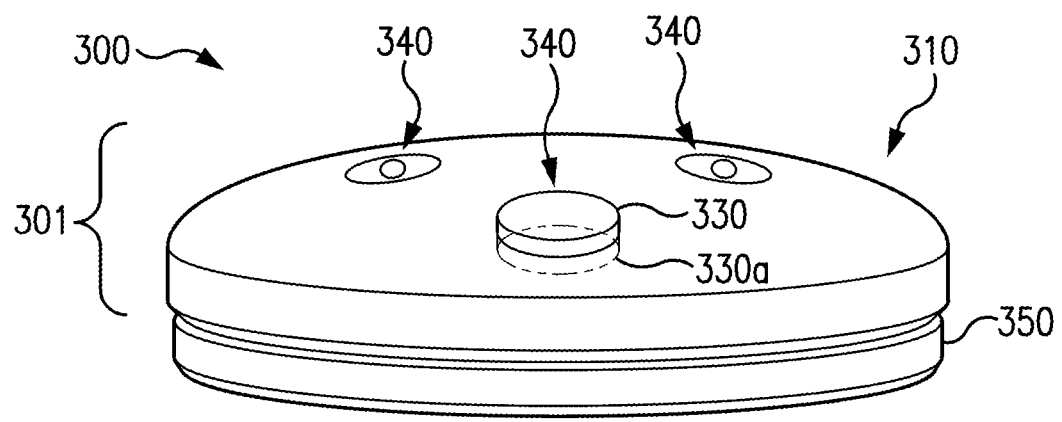
FIG. 3 is a perspective view of another embodiment of an interactive package top featuring a shell with a reversibly deformable launching station. The embodiment comprises ornamentation or decoration so as to have the appearance of a face, e.g., an animal.

FIG. 3 depicts a perspective view of an embodiment of interactive lid 300, which as shown comprises a body 301 with exterior shell 310. The shell 310 also features launching area or launching station 330. Multiple launching areas may be present in other embodiments. The launching station 330 is generally formed as an extension of shell 310. The shell 310 need not be constructed of reversibly deformable material.

The launching area or station 330 can be partially or fully deformed to position 330*a*. An item from the package may be placed in the deformed launching station 330. The popping back of the launching area or station from its deformed shape to its undeformed shape serves to launch or propel the item out of the launching station 330 and away from the lid 300.

The interactive package lid 300 may also further comprise decorative or ornamental features 340, to make the interactive package more appealing. The interactive package lid may also have a sealing component 350 adapted for use with a container of items that can be launched with the interactive lid 300.

Figure 4:
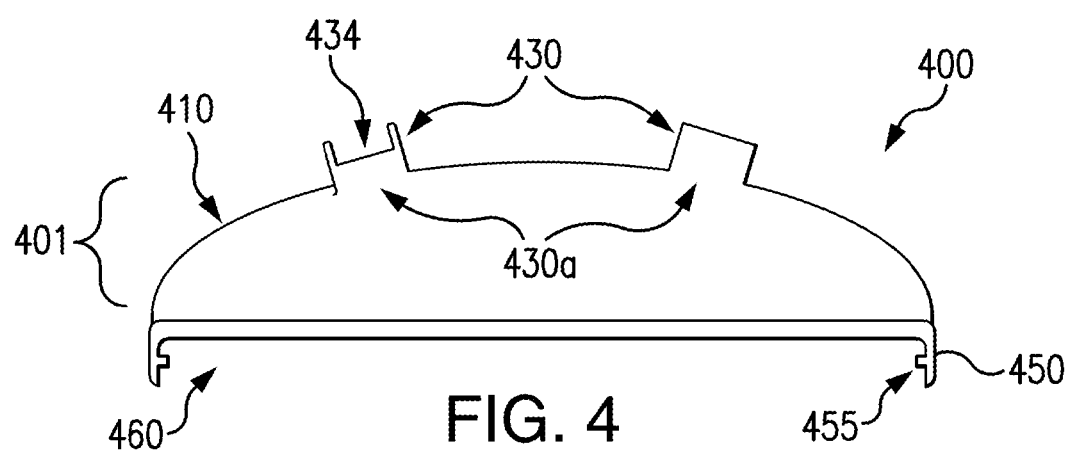
FIG. 4 is a cross-section of another embodiment of an interactive package lid with two launching stations extending from the body that have a shape complementary to that of the item (e.g., animal treat) to be launched. The launching stations can be deformed partially or fully by the user to launch as object such as an animal treat. The sealing component is shown as a snap-on lid featuring a sealing bead or lip.

With further reference to the figures, FIG. 4 depicts a cross-sectional view of an embodiment of an interactive package lid 400. The body of lid 400 comprises shell 410 with two launching stations 430 extending therefrom to facilitate launching of an object. The launching stations 430 can have a shape/profile that is at least partially complementary to the object to be launched to enhance launching, or merely for aesthetic reasons. Object holder 434 (a depression at the end of launching station 430) can be present to help retain the object to be launched prior to the launch.

Interactive package lid 400 also comprises a sealing component 450 that is preferably made of plastic that is sufficiently flexible to permit the sealing component to be used to seal a base package (e.g. container (not shown)) of product (such as food or treats). The sealing component 450 preferably comprises rim or bead 455 that allows the sealing component 450 to 'snap' onto a container of product(s). The space 460 is defined by the walls of sealing component 450 and accommodates the top portion of the container. The sealing component 450 is preferably affixed to the lid body 401 or shell 410 such that when the sealing component 450 is snapped onto the container of product, the entire body of interactive package lid 400 is also secured on the container, e.g., for storage. It should be evident that during play/use of the interactive package lid 400, the lid may be in place on the container, or may be used elsewhere, e.g., on any convenient surface such as a table, floor, or the like.

Figure 5:
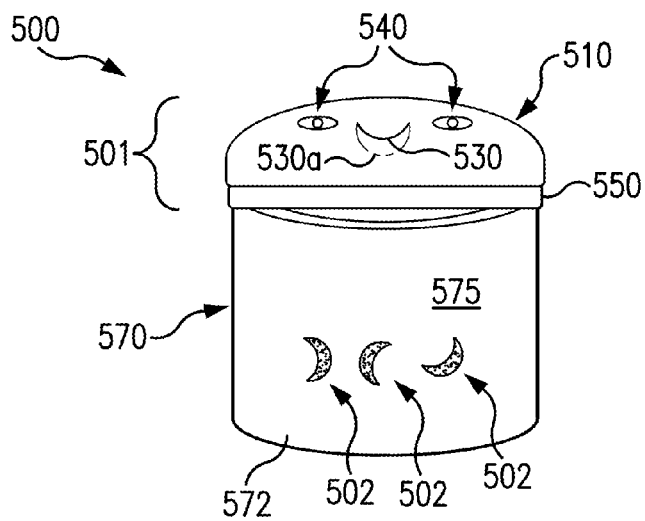
FIG. 5 is a perspective view of an embodiment of the interactive package comprising an interactive lid with a container comprising a plurality of items. The container is initially sealed closed with a temporary seal that can be removed upon opening and replaced with the interactive package lid that includes a snap-on component. Also depicted is the launching station with a shape that is complementary to the items in the package. The launching station in this embodiment does not extend from the surface substantially in the undeformed state, but in the fully deformed state appear as an indentation.

With further reference to the figures, FIG. 5 depicts an embodiment of the interactive package 500 comprising an interactive package lid 501 on a container 570 of products 502. The skilled artisan will appreciate that the interactive package lid 501 is shown resting on container 570 but not yet sealed or 'snapped" on to the container 570. The interactive package lid 501 comprises shell 510 with launching area or station 530, which is adapted to receive complementary-shaped object 502, preferably a food, such as a snack or a treat. In this embodiment, the interactive lid 501 can have a shell 510 that is entirely reversibly deformable as depicted in FIG. 1, or can be designed such that only the launching stations are reversibly deformable, such as depicted in FIGS. 2 to 4 and 6 to 8. The interactive package lid further comprises sealing component 550 adapted to snap fit onto the container 570. Container 570 comprises bottom end 572 and top end 575. As container 570 may be marketed and/or sold as a separate unit from the interactive package lid 501, top end 575, which provides access to the product 502, is generally sealed. Removable or tear-away or peel seals such as plastic film or aluminum foil seals (not shown) covered with a plastic lid (not shown) are commonly used to cover the opening at top end 575.

In practice, the base container 570 may be purchased by a consumer as a replacement container of product. The consumer removes the plastic snap lid (not shown) and removes the inner peel seal (not shown) to open the container 570. One or more products 502 can be launched with the interactive package lid 501, for example in an engaging play session with a companion animal when product 502 is a pet treat. The launching station 530 is deformed to position indicated as 530*a*. The treat 502 can be placed on or in the deformed launching area 530*b*. After a period of time (e.g., a few seconds), the treat is launched for the companion animal to catch and/or eat. Upon the conclusion of play, the package sealing base 550 of the interactive package lid 501 is snapped into place upon container 570 thereby sealing the contents of the container 570 and securing the package lid 501 to the container 570 for convenient storage until the next desired use.

Figure 6:
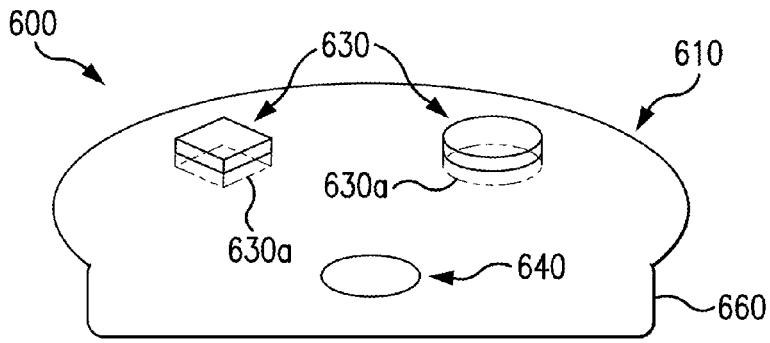
FIG. 6 shows a cross-section of an embodiment of the interactive package lid featuring reversibly deformable launching stations with profiles complementary to a variety of shapes of objects (e.g., animal treats) for launching a plurality of such objects at one time. The interactive package lid features a bottom portion that is convenient for use on a container or remote from the container, including on a surface such as a floor or table.

With further reference to the figures, FIG. 6 shows an embodiment of the interactive package top 600. The interactive top 600 comprises a shell 610 and two launching stations 630. Launching stations 630 can be of the same or different shapes/profiles. The interactive packaging top 600 can also have decorations or ornamentations 640. The embodiment shown also features bottom 660 but a sealing component is not shown in this embodiment. Accordingly, while this interactive packaging top 600 may come with a container, and may be stored with the container, it does not necessarily comprise a snap-type lid. Bottom 660 may be attached to a container having its own lid via any removable means known in the art, including hooks and loops (e.g. Velcro-type closures), magnets, or the like. Alternatively, the package top 600 may be attached to a container via other means. Bottom 660 may also fit into a secondary lid or a container much like a cork in a bottle, i.e., it may be pressed on and/or retained by frictional forces in the container or in a recess in the secondary lid of the container.

The launching stations 630 extend from the body 601 and shell 610 in their undeformed shape. The launching stations 630 can be partially or fully deformed to position 630*a*, and loaded with suitable treats 602. After a delay of about one to several seconds, the launching station 630 springs back to its undeformed original state in a manner that launches or propels the treat(s) 602 into the air. A trigger/release mechanism (see FIG. 8) may be utilized to abbreviate the wait (launch time delay) and generate a launch more quickly.

Figure 6A:
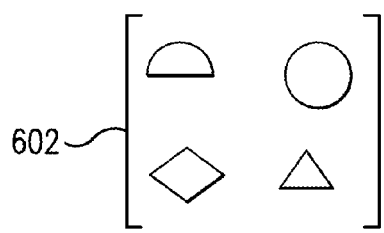
FIG. 6A shows a plurality of possible shapes for objects (e.g. animal treats) that the launching stations depicted in FIG. 6 can accommodate for launching.

The launching stations 630 are adapted to accommodate either one single item 602 (e.g., pet treat) or a plurality of smaller items 602 that have the same cross-sectional profile as the larger item. A variety of suitable profiles for treats 602 are shown in FIG. 6A. It will be evident to the skilled practitioner that the different shapes/profiles could represent different colors and or flavors or compositions or treats, thereby introducing even more fun and variety into the activity permitted by the interactive packaging disclosed herein. A plurality of treats may be launched together. This may be particularly useful where a human has more than one companion animal.

Figure 7A:
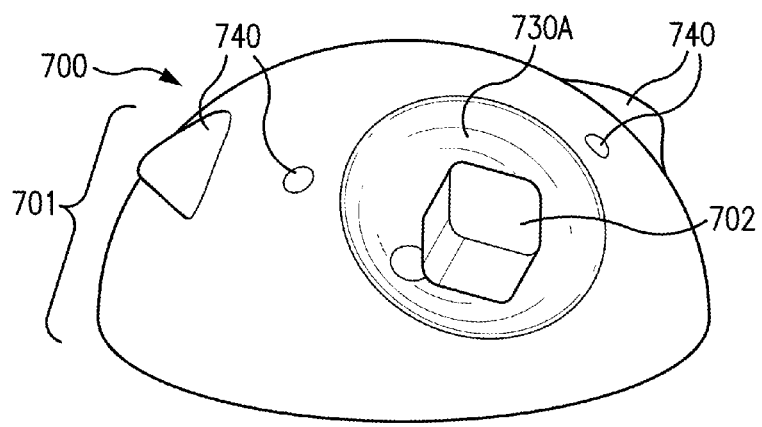
FIG. 7A is a perspective view of the embodiment, showing the launching station "nose" in a depressed state and containing an item of the package contents.
Figure 7B:
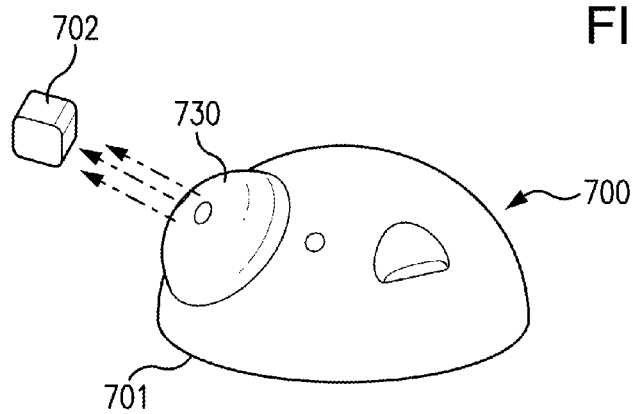
FIGS. 7B and 7C show the interactive package lid with the "nose" being a launching station that protrudes in its original (undeformed) state.
Figure 7C:
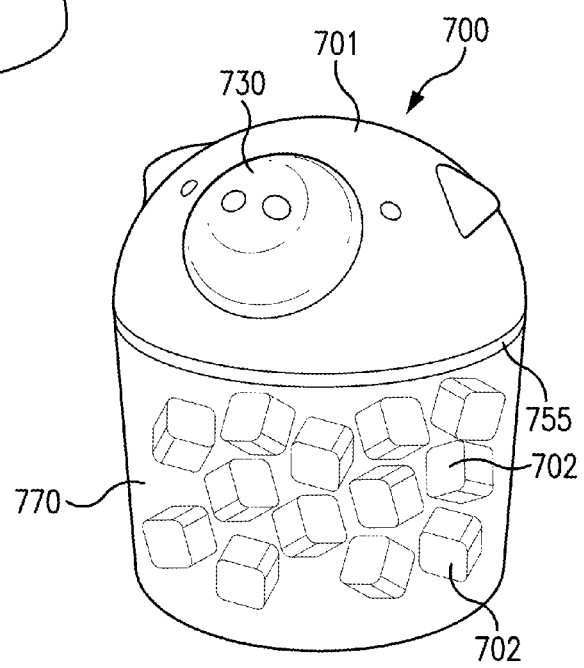

FIG. 7 depicts an embodiment 700 of interactive package top 700 in which the launching station 730 and the ornamentation 740 together form the features of a fanciful animal head, with the "nose" being a launching station 730 that protrudes in its original (undeformed) state, as shown in FIG. 7B. FIG. 7A shows the launching station 730 "nose" in its fully deformed position 730A, and holding an object 702 (such as a pet treat). FIG. 7B shows same embodiment of interactive lid 700 as shown in FIG. 7A, with the launching station 730 in the act of springing back to its original protruded shape, thereby launching the object 702 into the air. FIG. 7C depicts the interactive top 700 of FIGS. 7A and 7B, assembled with a secondary lid 755, which is affixed to container 770 that holds objects 702 suitable for launching. Interactive top 700 comprises a bottom portion (not shown) that is inserted into the secondary lid assembly 755, which can snaps over or insert into the container 770, thereby sealing it. Thus, in this embodiment, interactive top 700 may be packaged and sold assembled with container 770 of items 702, sealed with secondary lid assembly 755; however, the consumer can purchase "refill" packages comprising only the container 770 of items 702 sealed by secondary lid assembly 755. The originally purchased interactive top 700 can be fit onto such refill packages, thereby economizing on cost and usage of materials.

Figure 8A:
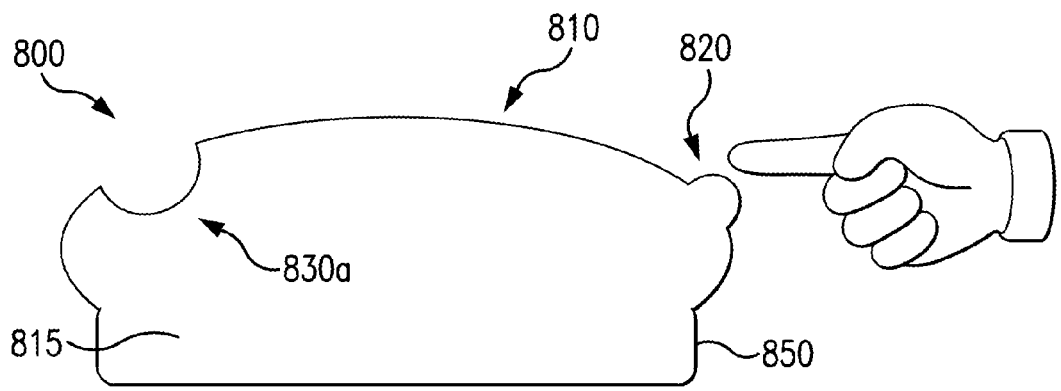
FIG. 8A shows the interactive package lid with launching station in a fully deformed state.
Figure 8B:
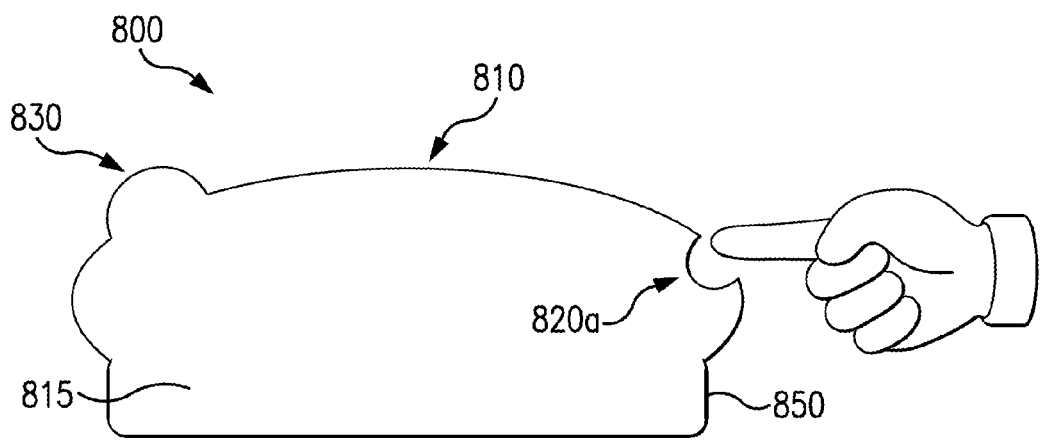
FIG. 8B shows a cross-section of the same embodiment with the launching station in an undeformed state (e.g. post-launch). Note that trigger/release mechanism has been engaged. Engagement of the trigger/release mechanism can be used to hasten the launch of an object rather than waiting for the launching station to spring back to the undeformed shape.

Another aspect of the invention can be further understood by reference to the embodiment depicted in FIGS. 8A and 8B which show, in cross section, an embodiment of interactive package top 800 comprising a body 801 surrounded by shell 810 and a sealing component 850. As can be seen in FIG. 8A, the launching station 830*a* is in the fully deformed position. As with the launching stations of the prior aspects of the disclosure, the launching stations 830 may be of any shape including shapes/profiles that are complementary to the item to be launched, e.g., a pet treat. The shell 810 also features trigger/release mechanism 820, enabling a user to manually trigger the launching station to pop back to its original configuration, thereby abbreviating the launch time or initiating an immediate launch.

Thus, FIG. 8B shows a representation of the interactive package lid 800 after launching, i.e., after the trigger/release mechanism has been employed. A variety of trigger mechanisms are contemplated for use herein. The trigger/release mechanism 820 can simply be a hole in the shell that allows the user to force the deformed launching station 830*a* to 'pop' back to its original state 830, e.g. by inserting a finger and pushing on the deformed launching station 830*a*. The trigger 820 can also comprise a mechanical structure (not shown) that pushes the deformed launching station back into its original shape. As depicted, the trigger 820 is itself a reversibly deformable structure. While the body of the packaging lid need not be a sealed structure, for such a trigger as that depicted, a sealed body is preferred. When the trigger/release mechanism 820 is pressed, e.g., to position 820*a*, the increase in internal pressure within the body hastens the elastic deformation of launching station from deformed position 830*a* back to original shape 830. In one embodiment, the trigger mechanism and the launching station are fully interchangeable and in a mutual balance such that when one is moved to its deformed position, the other returns to its original position.

FIG. 9 depicts an embodiment of an interactive package 900, featuring an animal (pig)-shaped interactive package lid with launching station 930 formed as part of the nose. FIG.

9A shows a top-side view of showing the body 901 and the container 970. The ears 912 and eyes 914 are mere ornamental in this embodiment. Container 970 typically contains a plurality of items (e.g. treats, not shown) to be launched. FIG. 9B shows a left-side view of interactive package 900. As can clearly be seen, in the un-deformed state, the launching station 930 (i.e. nose) protrudes only slightly out past the nearby surface of the shell 910. In some embodiments the launching station may not protrude past the shell surface to any substantial degree. As can be seen, the angle of the launching station is set to facilitate the launching of items from the launching station.

Figure 9A:
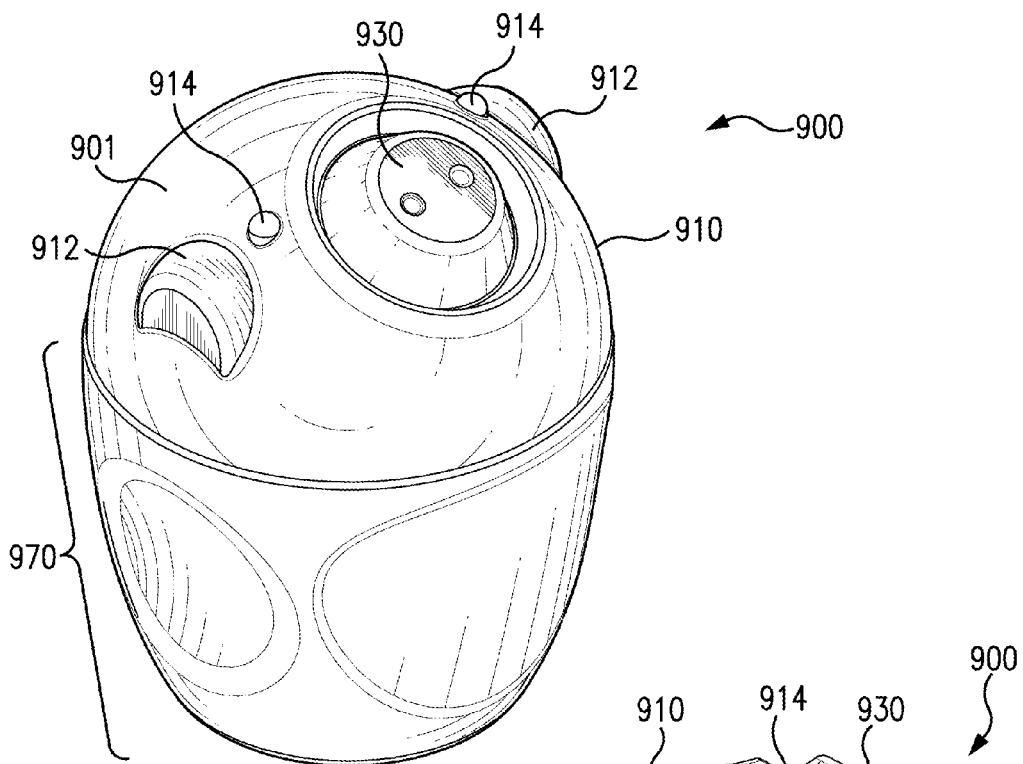
FIG. 9A is a perspective view showing the launching station relative to the shell. The lid is shaped generally like an animal head, and in particular a pig. The launching station is located in the pig's nose.
Figure 9B:
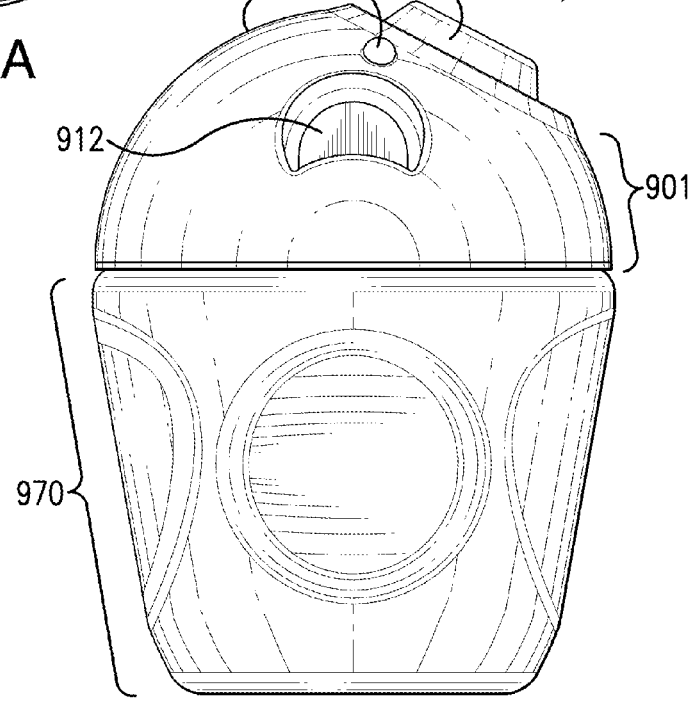
FIG. 9B is a side view of the interactive package showing the angle at which the launch station has been placed.
Figure 9C:
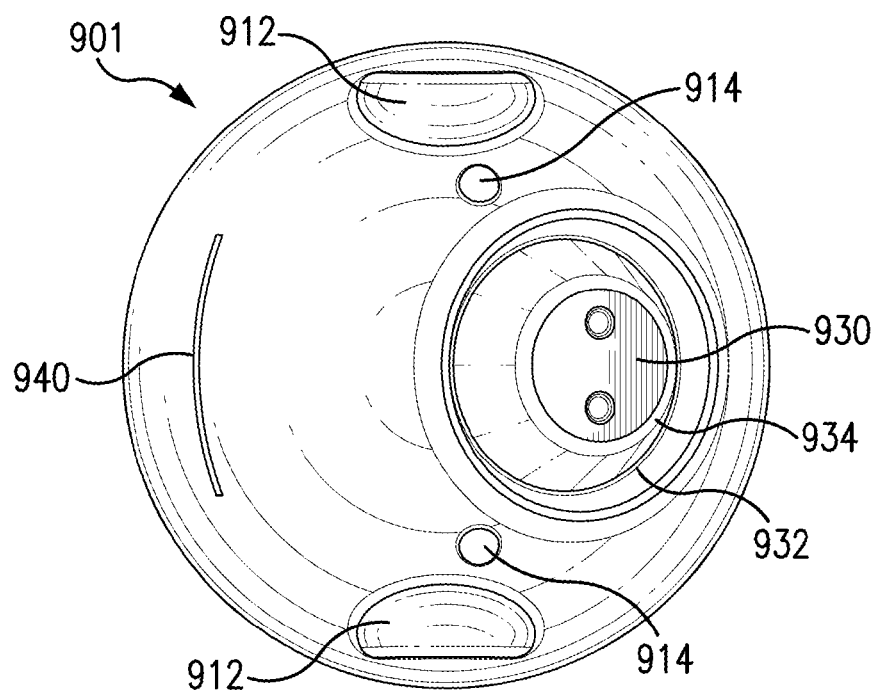
FIGS. 9C-9F depict further detail of the lid of the interactive package shown in FIGS. 9A and 9B.
Figure 9D:
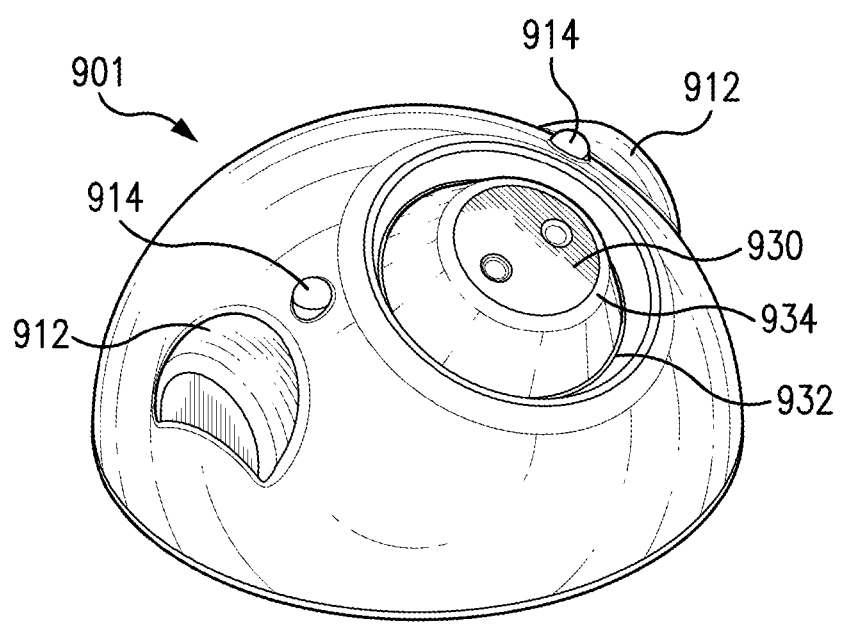
Figure 9E:
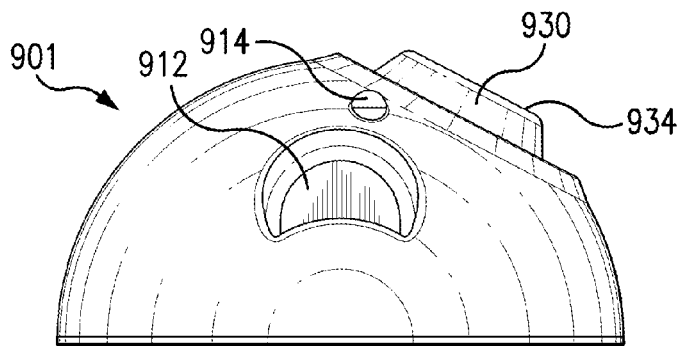
Figure 9F:
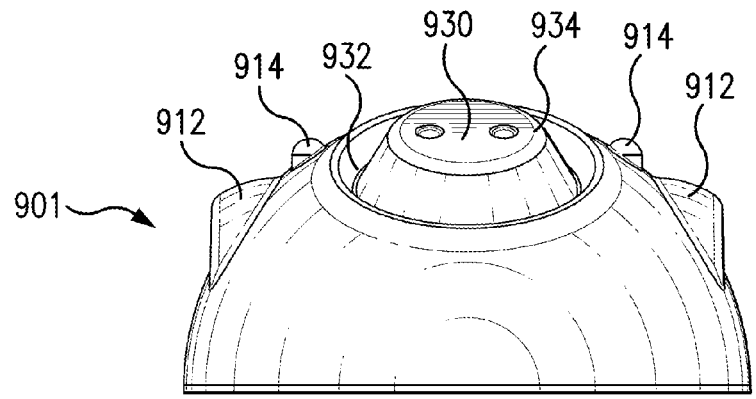

FIGS. 9C-9F depict more detail of the interactive package lid shown in FIGS. 9A and 9B. FIG. 9C is a top view of the interactive package lid arranged in the same orientation as FIG. 9B; FIG. 9D is a perspective view; FIG. 9E is a side view; and FIG. 9F is a front view of the same embodiment of interactive package lid. Also visible in FIG. 9C is some ornamentation 940, used in this case for branding purposes. The ornamentation 940 may be molded into to the package (as indenting/impressing, or as embossing), or applied to the package after manufacture, e.g., as a surface treatment such as screening. Embodiments similar that shown in FIGS. 9C-9F were used in the Example. FIGS. 9C-9F show further details of the launching station 930. The design and geometry of the launching station 930 introduce two stress points, first in the recessed valley 932 around the bottom perimeter of the launching station, and second around the perimeter of the top flat portion 934. When the launching station is pressed, the station inverts, causing the material to deform in those specific locations, and to bounce back to its original shape after a time delay, thereby launching the treat.

Figure 9G:
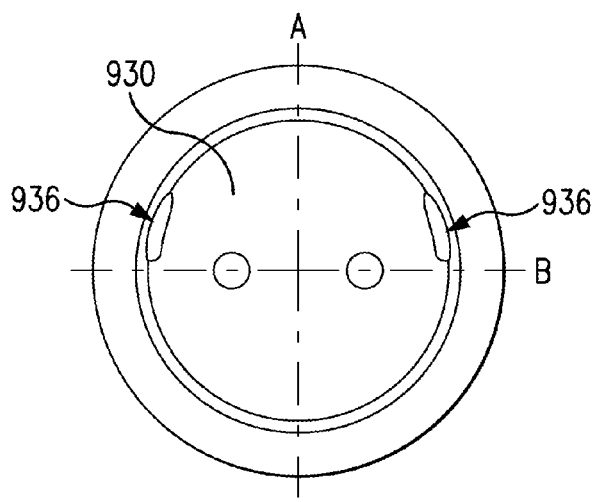
FIG. 9G is a top view of a variation of the launching station shown in FIGS. 9C-9F.

FIG. 9G shows a variation of the launching station shown in FIGS. 9C-9F. Namely, an additional temporary delay is created by the inclusion of slits 936 on the inside flat surface of the launching station (two slits shown in the 10 and 2 o'clock locations relative to axes A and B depicted. The slits alter the delay in the launching station returning to its original position by providing temporary pressure relief.

With respect to the interactive package components disclosed herein for any of the various aspects of the invention, generally it is preferred that the interactive package component is manufactured from material that is 'dishwasher safe' so that it can be maintained in a clean and sanitary form. The interactive package or package component (e.g. lid or top) may be made of one or more materials suitable for such purpose. Preferred for at least some portion thereof are materials that are elastically deformable and which have sufficient 'spring' (i.e. timing, force, etc.) upon return to the original shape that a package item (e.g. a food item, treat or toy) is launched from the interactive package to a distance from the interactive package. The distance of the launch may range from about a foot to several feet or even several yards in certain embodiments. The materials for constructing the interactive packages or package components may be selected to produce lids or tops with varied delay times (e.g. short, medium, and long times) or varied distances (e.g. short, medium, and far distances), or a combination thereof. Moreover, the response/delay time, distance, and or direction of launch for any interactive package or package component are each expected to vary (as discussed below for response/delay time) for any given device. The skilled artisan will appreciate that the material selected may be temperature sensitive and materials may also be selected for the properties (including elasticity) for warm weather conditions, cold weather conditions or indoor ambient conditions. It is understood that a particular material may function ideally for an interactive package at room temperature, but may function poorly or not at a different temperature.

The inventors have also discovered that creating interactive packages or package of different thicknesses can provide different properties. Delay time, distance of launch, and distribution/direction of launch can all vary based on the thickness of e.g. the elastomeric polymer or other aspects of the launching stations for example.

The body of the interactive package component, e.g., lid or top, can be shaped in any convenient form. In various embodiments, the shell of the body has a geometric shape, such as a cube, pyramid, rectangle, sphere, cone or dome. The lid may also be shaped like an animal, or the head and/or face of an animal, for instance a companion animal, such as a dog or a cat, a zoo or wild animal such as a lion, elephant, or tiger, a farm animal such as a cow, pig, or horse, or a whimsical or fictitious animal such as a cartoon mouse, unicorn, or humanoid.

The lid may also have the shape of an inanimate object such as a ball (baseball, football, basketball, or the like), a car or train, or a rocket, submarine, or flying saucer or the like, or of creatures such as a monster or aliens. The interactive packaging components can also be shaped according to a particular time of year or season; for example, a winter package might have a Santa or snowman profile, while a spring package might have the profile of a lamb, bunny, or egg. Interactive packages comprising a body or other features shaped like food items, such as hot dogs, hamburgers, or ice cream cones are also contemplated for use herein.

The lid can be manufactured in any color or pattern, and can be decorated in any fashion. The interactive portion of the package can have the same color or a different color than the remainder of the package. The color(s) may be solid or in any pattern such as stripes, dots, checks, swirls, tie-dye patterns, or the like, or any combinations thereof. In addition, the interactive packages may be fluorescent or luminescent (e.g. glow-in-the-dark) for added functionality. The color can be integral to the component; however, in some embodiments the color and/or one or more decorations may be surface treatments added, e.g., after manufacture. In various embodiments as disclosed above, the interactive component of the package can have the profile of an animal or an animal's head, and the remainder of the package can be decorated accordingly to look like a face. In such embodiments, one or more launching stations can positioned as eyes, nose or mouth. Decorations can also be selected that match seasonal shapes, food shapes, or the like.

The packaged item intended for launching with the interactive package can be any consumer item. In one embodiment, the item is a consumable item, such as a food item, snack, or treat for a human or a companion animal. The food, snack, or treat can be launched as part of a game between people or between people and their companion animals. Children are familiar with games like piñatas wherein treat or snacks are made available when a piñata is broken open. In the case of the interactive package lid, a group of children can have fun sharing a snack food that is launched into the group. A game can be made for companion animals in which a person launches a treat and the companion animal chases and eats it. Such positive interactions are beneficial for the health of the companion animal and the human caretaker. The distribution of the treats can be done in conjunction with training (e.g., practice of oral direction or hand-signals) or just for a fun or play activity for the companion animal.

In another embodiment, the packaged item for launching is a nonfood consumer item such as a toy or toy part. The toy can be launched and caught, or launched and chased, or launched as part of game, contest, or assembly of a larger toy. A target, such as a basket or goal can also be used in conjunction with various embodiments of the invention herein.

In addition to the shell of the interactive package component being any desired shape, the launching stations may comprise any shape, including geometric shapes of any type, animals, inanimate shapes, and more. In one embodiment, the launching station is of a shape that is complementary or at least partially complementary to the packaged item, i.e., the item to be launched. This is particularly useful when the packaged item is a snack or a treat. In one embodiment, the complementary profile shape of the launching station provides a good fit that is not too tight and not too loose for the treat, thus positioning the treat for a better launch. It should be noted that the launching station need not comprise an extension or indentation, but indentations can be useful to hold the treat in place prior to launch. Where there is no indentation a treat is simply placed on the launching area. These areas may be clearly indicated by different colors on the shell or indicia or markings on the interactive packaging lid or base container, or in the instructions.

In various embodiments, there is a time delay between deforming the interactive package component and the launching of the object. The time from deformation to launch can range from about 1 second or less to about 30 seconds or even longer, and may vary with each launch, thereby introducing additional entertainment due to lack of predictability. Alternatively, the user may utilize a trigger/release mechanism to initiate the launch, as described in greater detail below. The time from initial deformation to launch can be at least about 0.5 seconds, at least about 1 second, or at least about 2 seconds, or at least about 3 seconds, or at least about 4 seconds, or at least about 5 seconds, or at least about 6 seconds, or at least about 7 seconds, or at least about 8 seconds, or at least about 9 seconds, or at least about 10 seconds, or at least about 11 seconds, or at least about 12 seconds, or at least about 13 seconds, or at least about 14 seconds, or at least about 15 seconds, or at least about 16 seconds, or at least about 17 seconds, or at least about 18 seconds, or at least about 19 seconds, or at least about 20 seconds, or at least about 21 seconds, or at least about 22 seconds, or at least about 23 seconds, or at least about 24 seconds, or at least about 25 seconds, or at least about 26 seconds, or at least about 27 seconds, or at least about 28 seconds, or at least about 29 seconds, or at least about 30 seconds. In some embodiments, the delay can be even longer, for instance, at least about 35 seconds, or at least about 40 seconds, or at least about 45 seconds, or at least about 50 seconds, or at least about 55 seconds, or at least about a minute, or even longer. In various embodiments, the launch will occur within about 1 second, or within about 2 seconds, or within about 3 seconds, or within about 4 seconds, or within about 5 seconds, or within about 6 seconds, or within about 7 seconds, or within about 8 seconds, or within about 9 seconds, or within about 10 seconds, or within about 11 seconds, or within about 12 seconds, or within about 13 seconds, or within about 14 seconds, or within about 15 seconds, or within about 16 seconds, or within about 17 seconds, or within about 18 seconds, or within about 19 seconds, or within about 20 seconds, or within about 21 seconds, or within about 22 seconds, or within about 23 seconds, or within about 24 seconds, or within about 25 seconds, or within about 26 seconds, or within about 27 seconds, or within about 28 seconds, or within about 29 seconds, or within about 30 seconds from the initial deformation. In some embodiments, the launch can occur within about 35 seconds, or within about 40 seconds, or within about 45 seconds, or within about 50 seconds, or within about 55 seconds, or within about a minute from the initial deformation. In certain embodiments, the time to launch is from about 1 to 15 seconds; more particularly the time is less than about 10 seconds. In one embodiment, the launch time is range centered between about 2-3 seconds and 5-7 seconds, with some launches as fast as about 1 second or less and some as slow as about 10 or more seconds. The launch time responses may be normally distributed about the average time, or other distributions are possible, such as distributions skewed in one direction or another, bimodal distributions or the like. The launch time can be estimated at least in part by the material from which shell or the launching area is made, the thickness of the material and the cross-sectional profile/shape of the deformable area. In certain embodiments, one or more air holes can be introduced into the shell or deformable portion thereof, and these holes can function to facilitate the springing back of the material and/or the timing thereof. In some cases there will be statistical outliers wherein the delay is much much longer than the average delay time, so much so that the average launch time is actually increased. In some embodiments statistical measures are used to eliminate such lengthy outliers from the pool of data used to determine the average delay time. In some embodiments, the delay time may vary with the user. This may be a result of the user's strength, such as hand or finger strength, or the degree to which a user deforms the launching station before releasing the station in preparation for the launch.

The interactive package components are generally made from any materials suitable for packaging such as wood, glass, ceramics, polymers, plastics, rubber, silicone, or other natural or synthetic materials. In one embodiment, the package component comprises a plastic, such as polypropylene. The body or shell of the interactive component, e.g., lid or top, can comprise any one or more materials suitable for use in packaging. Preferably, the body will be strong enough for extended play and resistant to repeated use. The lid body, shell, launching stations, and/or launching connectors in various embodiments are reversibly deformable and/or comprise materials that are reversibly deformable. Examples of materials useful herein for launching stations or other reversibly deformable components include rubber (e.g., medium or high durometer rubber), and silicone, polyethylene material such as linear low-density polyethylene, polypropylene, polyethylene terephthalate, or the like, or any useful combinations thereof. The skilled artisan will appreciate that a variety of materials or constructions can be used or made to be reversibly deformable. These can include flexible or semi-flexible materials that have the requisite "shape memory," or they can include rigid or semi-rigid materials constructed with articulations, hinges, springs, suction cups and the like, so as to be reversibly deformable, for instance as described in U.S. Pat. Nos. 5,797,815 and 6,805,077, among others. Indeed, reversibly deformable spring-loaded devices are well known in the art of toys and games. If such devices are used in the interactive package components of the invention, they can be conducive to embodiments in which the delay in springing or popping back to the original shape can be controlled by a user, such as by releasing a catch on a spring, for example.

Examples of elastically deformable materials that are useful herein include commercially available polymers including thermoplastic polymers that can be extruded or injection molded to form interactive packages or package components such as lids or tops useful herein. In one embodiment the materials can be extruded or injection molded at temperatures between about 160° C. and 250° C. Such materials are conveniently available in pellets or similar useful forms. In various embodiments, the materials may have a Shore A hardness that ranges from about 1 to 100, more preferably 10 to 90, 20 to 80, or 30 to 70. In certain embodiments material with a Shore A hardness of 30 to 40, 40 to 50, 50 to 60, or 60 to 70 is useful. Shore A hardness for purposes herein may be measured in accordance with any accepted Shore A hardness testing such as a Durometer testing procedure under ASTM D2240. In particular embodiments, the elastomeric material comprises a thermoplastic elastomer (TPE), including but not limited to styrenic block copolymers, polyolefin blends, elastomeric alloys, thermoplastic polyurethanes, thermoplastic copolyesters and thermoplastic polyamides. In one embodiment, the TPE is an olefin-based TPE. This material is particularly suitable for combination with a package base that comprises a polypropylene. Other elastomeric materials that can be used include, but are not limited to, natural and/or synthetic rubber, silicone, materials incorporating the proteins resilin and/or elastin, and elastolefin.

The other package components, such as the container that holds products suitable for launching, in various embodiments can be made of any packaging material commonly used for such purpose, including plastic, paper or glass. In certain embodiments, the packaging is manufactured at least partially from recycled materials, or from non-plastic materials including cardboard, wood, glass, metal, styrofoam, and the like.

In addition to the launching functionality, the interactive package component can include other functionality to enhance interaction with the product and/or enjoyment or interaction with another person or companion animal. For example, the interactive package can include additional functionality of playing sounds or sound effects, by including 'hardware' for such functions. Such sounds may be as simple as a air-regulated popping sound and/or 'squeaky toy'-type sound, wherein a portion of the compressive force is used to create sound created by/with the escaping air passing through an opening adapted to produce sound.

The interactive package component can also include electronic sounds that are controlled (e.g., by a micro-switch, sensor, or the like) or activated by pressing or striking the interactive package components, or by the escape of air. The sound functions can also be controlled by a switch that is turned on by the user during use of the interactive package. In one embodiment, the electronic sounds include musical notes, fanfares, count-down sounds, whistles, animal sounds, or sound effects. Sound may also be created by a miniature digital sound recording device contained within the interactive packaging. Such devices are known in the art of toys, novelties, and greeting cards. Sounds for use herein may be played randomly or may be sequenced depending on an action the user is taking with interactive package component, for example launching a treat. In some embodiments the sounds include one or more sounds that are outside the frequency that can normally be heard by humans, for example sounds at a frequency that can be heard by dogs, but not humans. In some embodiments the interactive package or package component can make an audible "pop" or other sound when springing back to the original, undeformed shape. The shape of the lid or top or other components can be made to maximize such sounds, for example by including a hollow or other space that permits the sound to reverberate, amplify, or the like.

In addition to sound and/or sound 'functions', the interactive package can further comprise functionality that includes lights to enhance play, and to enhance use in the evening or in dark or dimly lit area. Such lights are also useful for added fun even in lighted areas and outdoors. As with the sound function, the lights can be controlled by a timing sequence or may be activated by the pressing or striking of the interactive package. In one embodiment the body, the flexible shell, or a portion thereof, are translucent or transparent and the lights are internal to the interactive portion of the package. In one embodiment, the light functions comprise one or more colored LEDs that can turn on, off, and flash in various patterns or sequences. Such lights may be movement-activated or pressure-activated, as are known in art of toys (e.g., balls and yo-yos).

In various embodiments, the interactive packages further comprise indicia or instructions printed on a surface of the packages. The indicia may include, for example, colors, numbers, letters, symbols, logos, advertisements, branding information, nutritional information, product information, manufacturer information, quick response codes (QR codes) and the like.

In one embodiment, the interactive package includes a brand name, company logo, or similar indicia of origin and/or advertisement, placed on or embedded in the package, preferably on the interactive packaging lid.

In another aspect of the invention, kits comprising the interactive package components combined physically or virtually with other components are provided. The components of such kits can be provided together in a single package or in separate containers in a virtual package, as appropriate for a kit component.

Generally the kits comprise
a) an interactive lid for a package adapted for propelling one or more contents of a package, such as those described herein;
b) a container adapted to receive the interactive package lid and comprising a plurality of items suitable for propelling with the interactive package lid, and optionally a temporary closure sealing the container and securing the plurality of items; and
c) optionally, one or more of: instructions for use or assembly of the kit components, information about the kit or kit components, safety information related to the kit or use thereof; information allowing a purchaser access to a website providing additional information.

In a preferred embodiment, the interactive package lid comprises a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid.

In a particular embodiment, the plurality of items includes food items. Particularly suitable food items are snack foods for humans or animal treats. In one embodiment, the food items are animal treats and the kit further includes one or more of information related to the health or wellness of an animal, information related to exercise or playful interactions with an animal, information about using the kit or kit components for promoting a healthy relationship with a companion animal or for promoting the well-being of animal.

The kits optionally comprise one or more refill containers adapted to receive the interactive package lid and comprising a plurality of items suitable for propelling with the interactive package lid, and at least a temporary closure sealing the container and securing the plurality of items therein. In one embodiment, the temporary closure is a tear-away lid, such as a plastic film or foil seal.

When the kit comprises a virtual package, the kit can be limited to instructions in a virtual environment in combination with one or more physical kit components. The kits may contain the kit components in any of various combinations and/or mixtures. For example, in one embodiment, the kit includes an interactive package lid as described herein and instructions for how to assemble and use the lid as a toy or in a game. In another embodiment, the kit includes an interactive package as described herein and one or more types of a consumable product suitable for launching with the interactive package lid.

In another of its several aspects, the invention provides methods for promoting the health or wellness of an animal. The methods comprise providing an interactive package component adapted for launching a food product, such as an animal treat, particularly in the course of a play activity. More particularly, in one embodiment the interactive package component is a lid comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid.

The lid, body, launching stations, and/or launching connectors may be according to any embodiments of the prior aspects disclosed herein. The interactive lid is adapted for launching or propelling a food product when the food product is placed on the lid, or in or over the one or more launching stations.

The methods also comprise providing instructions or information on using the interactive package lid for launching or propelling an object. Optionally, the methods further comprise promoting the interactive package lid for use in launching or propelling an object, improving the health of an animal, improving a relationship with an animal, or having an interactive play session with an animal.

In one embodiment, the methods comprise the further step of providing a food product capable of being launched or propelled with the interactive package lid. The interactive package lid may be affixed to the container that holds the food product, or may be separate.

In another aspect, the invention provides a means for communicating information about or instructions for an interactive package according to any of the embodiments described herein for one or more of (1) assembling and using the interactive package component; (2) describing the benefits of the interactive package; (3) promoting the health or wellness of an animal with the interactive package; or (4) improving relationships with an animal through play via use of the interactive package components.

The communication means can be a document, digital storage media, optical storage media, audio presentation, or visual display containing the information or instructions. More specifically, the means can be a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, or any combination thereof. A quick response (QR) code may also be used to provide information such as a phone number or web address where the consumer can obtain additional information about the interactive packages, or the like.

The following example is provided to describe the invention in greater detail. It is intended to illustrate, not to limit, the invention.

EXAMPLE

Testing of Interactive Package Tops for Launching Pet Treats

Interactive package tops ("popper lids") such as those shown in FIG. 9 were manufactured from a polyolefin blend TPE in different thicknesses, in accordance with the following general procedure.

1. molding process was allowed to reach steady state;
2. mold opened;
3. mold rotated 180°;
4. ejector plate fired and ejected lower 6 cavities onto under-press conveyer belt;
5. mold closed;
6. molten polymer injected popper lid mold base in 6 lower cavities and launching station portion in 6 upper cavities simultaneously, then repeated to Step 2;
7. under-press conveyor moved finished lid toward packaging station.

Initial tests were conducted to determine whether any differences could be detected between popper lids of different thickness. A single tester tested six different popper lids with ten launches each to determine differences based primarily on the "landing" distribution of launched treats (data not shown).

Subsequently, five popper lids were each tested by five testers launching 5 treats per popper lid. The popper lids had the following thicknesses (mm): 0.115, 0.125, 0.135, 0.145, 0.160 (these thicknesses were sometimes referred to in whole numbers, using the unit of 0.001 mm). The popper lids were tested for delay from the time of deformation to the time of launch (measure in seconds), the distance of the launch, and the trajectory (including direction, angle, etc. A stopwatch was used for timing the delay and a high-speed camera was used to record the trajectory for each launch. The popper lid was positioned on a standard height working table and a grid pattern was used on the floor to determine the landing location. A similar grid was position vertically opposite the camera to help track and plot the trajectories, including the apex and flight path. To help provide controls, the factors were standardized: (a) the popper lid was depressed and held for three seconds before releasing it; (b) using a new popper lid for each participant; each participant/tester used the same standing position; and (c) the position of the popper lid and the container were standardized. The position of each launched treat was recorded on a data sheet indicating positions corresponding to the grid on the floor.

Results:

A. Delay

Differences were observed in popper lids of different thicknesses. The data are shown in Table 1.

TABLE 1

Delay Times for Lids with Different Thicknesses

| | | Thickness (0.001 mm) | | | | |
| --- | --- | --- | --- | --- | --- | --- |
| Participant | | 115 | 125 | 135 | 145 | 160 |
| Male 1 | Delay Time (s) | 1.1 | 1 | 2.5 | 0.7 | 6.4 |
| | | 1 | 0.5 | 1 | 0.6 | 9.9 |
| | | 1.9 | 0.7 | 0.6 | 0.3 | 6.2 |
| | | 0.8 | 1.3 | 1.4 | 63 | 10.4 |

TABLE 1-continued

Delay Times for Lids with Different Thicknesses

| Participant | | Thickness (0.001 mm) | | | | |
|---|---|---|---|---|---|---|
| | | 115 | 125 | 135 | 145 | 160 |
| | | 0.8 | 0.2 | 0.2 | 24.6 | 9 |
| | Avg. Delay | 1.12 | 0.74 | 1.14 | 17.84 | 8.38 |
| Female 1 | Delay Time (s) | 4 | 1.4 | 0.2 | 85 | 2.2 |
| | | 2 | 0.3 | 0.2 | 1.4 | 3.1 |
| | | 0.3 | 0.3 | 0.2 | 1.5 | 3.5 |
| | | 10.8 | 0.2 | 1 | 1.5 | 2.2 |
| | | 1.3 | 0.2 | 0.5 | 0.8 | 5.8 |
| | Avg. Delay | 3.68 | 0.48 | 0.42 | 18.04 | 3.36 |
| Male 2 | Delay Time (s) | 6 | 0.5 | 0.3 | 63 | 0.9 |
| | | 0.8 | 0.3 | 5 | 8.3 | 0.3 |
| | | 2.2 | 1.9 | 3 | 8.6 | 0.7 |
| | | 1.8 | 40 | 27 | 11.8 | 0.6 |
| | | 0.4 | 15.4 | 1.7 | 7.7 | 1 |
| | Avg. Delay | 2.24 | 11.62 | 7.4 | 19.88 | 0.7 |
| Female 2 | Delay Time (s) | 8.3 | 0.4 | 4.7 | 1.3 | 0.7 |
| | | 0.6 | 0.9 | 1.2 | 1.5 | 0.6 |
| | | 0.3 | 0.8 | 1 | 9.8 | 3.2 |
| | | 1.6 | 0.7 | 1.6 | 1 | 2.8 |
| | | 2.3 | 0.8 | 1.1 | 2.5 | 3.3 |
| | Avg. Delay | 2.62 | 0.72 | 1.92 | 3.22 | 2.12 |
| Male 3 | Delay Time (s) | 0.5 | 34 | 0.4 | 1.8 | 0.3 |
| | | 0.3 | 1 | 3.1 | 2.8 | 1.6 |
| | | 15.2 | 0.9 | 29 | 14 | 0.4 |
| | | 0.7 | 1 | 17 | 2.7 | 1.1 |
| | | 0.5 | 0.8 | 27 | 1.4 | 1.9 |
| | Avg. Delay | 3.44 | 7.54 | 15.3 | 4.54 | 1.06 |

As can be seen, there is substantial variation between testers and within a single tester for a given popper lid. Delay times ranges from less than 1 second to almost one and half minutes. There also appear to be differences between popper lids of different thicknesses. Other differences may be inferred. The thicker popper lids were more likely to exhibit prolonged delays than the thinnest popper lids.

Figure 10:
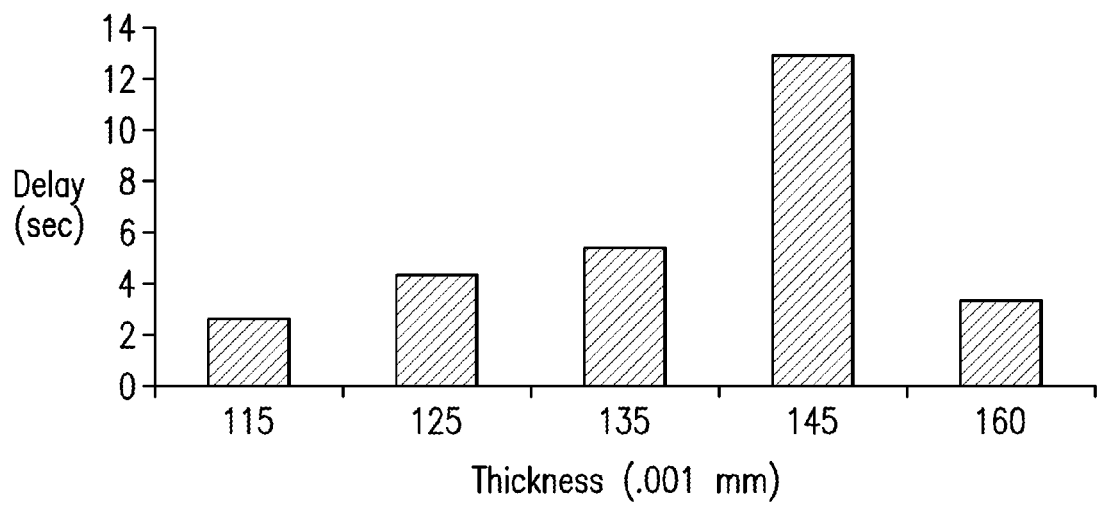
FIG. 10 is a bar chart showing the average delay time to launch with five popper lids, each having a different thickness.

FIG. 10 shows the data plotted on a bar graph after removing the outliers. Generally the thicker the popper lid, the longer the delay that was observed under the test conditions. The range of delay was about 2.4 seconds to about 12.7 seconds. However, the thickest popper lid did not follow the trend and provided only about 3.1 seconds delay on average.

B. Distance

Differences in launch distance were also observed in popper lids of different thicknesses. The data are shown in Table 2.

TABLE 2

Launch Distance

| Participant | | Thickness (0.001 mm) | | | | |
|---|---|---|---|---|---|---|
| | | 115 | 125 | 135 | 145 | 160 |
| Male 1 | Launch | 13.81 | 15.4 | 18.8 | 17.68 | 17.33 |
| | Distance | 15 | 15.23 | 14.5 | 14.93 | 15.67 |
| | (cm/10) | 11.24 | 16.67 | 17.3 | 17.14 | 15.81 |
| | | 14.96 | 14.42 | 13.78 | 14.51 | 14.59 |
| | | 14.85 | 15.82 | 16.2 | 13.9 | 14.61 |
| | Avg. Launch Distance | 13.972 | 15.508 | 16.116 | 15.632 | 15.602 |
| Female 1 | Launch | 5 | 11.73 | 19.58 | 13.17 | 9.34 |
| | Distance | 2 | 15.41 | 16.1 | 15.7 | 10.31 |
| | (cm/10) | 13.72 | 16.94 | 17.03 | 17.05 | 11.43 |
| | | 2.05 | 15.51 | 16.27 | 16.74 | 13 |
| | | 16.1 | 16.11 | 16.83 | 17.1 | 17.12 |
| | Avg. Launch Distance | 7.774 | 15.14 | 17.162 | 15.952 | 12.24 |
| Male 2 | Launch | 9.06 | 16.63 | 4.32 | 15.91 | 7.73 |

TABLE 2-continued

Launch Distance

| Participant | | Thickness (0.001 mm) | | | | |
|---|---|---|---|---|---|---|
| | | 115 | 125 | 135 | 145 | 160 |
| | Distance | 9.54 | 6.04 | 13.59 | 14.33 | 7.78 |
| | (cm/10) | 7.21 | 10.7 | 14.04 | 18.29 | 8.72 |
| | | 11.49 | 15.24 | 13.94 | 11.92 | 6.14 |
| | | 12.93 | 12.62 | 16.2 | 14.42 | 9.33 |
| | Avg. Launch Distance | 10.046 | 12.246 | 12.418 | 14.974 | 7.94 |
| Female 2 | Launch | 13.52 | 17.99 | 15.28 | 17.84 | 17.3 |
| | Distance | 15.45 | 3.01 | 18.01 | 19.02 | 16.29 |
| | (cm/10) | 15.26 | 4.65 | 14.61 | 14.79 | 16.47 |
| | | 10.83 | 2.82 | 14.1 | 9.79 | 15.7 |
| | | 12.71 | 7.92 | 17.33 | 16.76 | 17.42 |
| | Avg. Launch Distance | 13.554 | 7.278 | 15.866 | 15.64 | 16.636 |
| Male 3 | Launch | 12.3 | 6.4 | 15.43 | 15.51 | 9.18 |
| | Distance | 10.98 | 3.61 | 15.7 | 15.91 | 9.23 |
| | (cm/10) | 10.38 | 4.53 | 12.24 | 14.81 | 10.16 |
| | | 10.33 | 2.67 | 3.3 | 15.19 | 8.85 |
| | | 4.72 | 2.62 | 5.14 | 14.58 | 7.75 |
| | Avg. Launch Distance | 9.742 | 3.966 | 10.362 | 15.2 | 9.034 |

The average distance for the popper lid of 0.145 mm thickness was 5.06 ft. Overall distance launched ranged from about twenty centimeter to about one-hundred-ninety-six centimeters. The longest launch was approximately 6.4 to 6.5 feet, while the shortest distance for a launch was 20 centimeters or about 0.6 feet.

Figure 11:
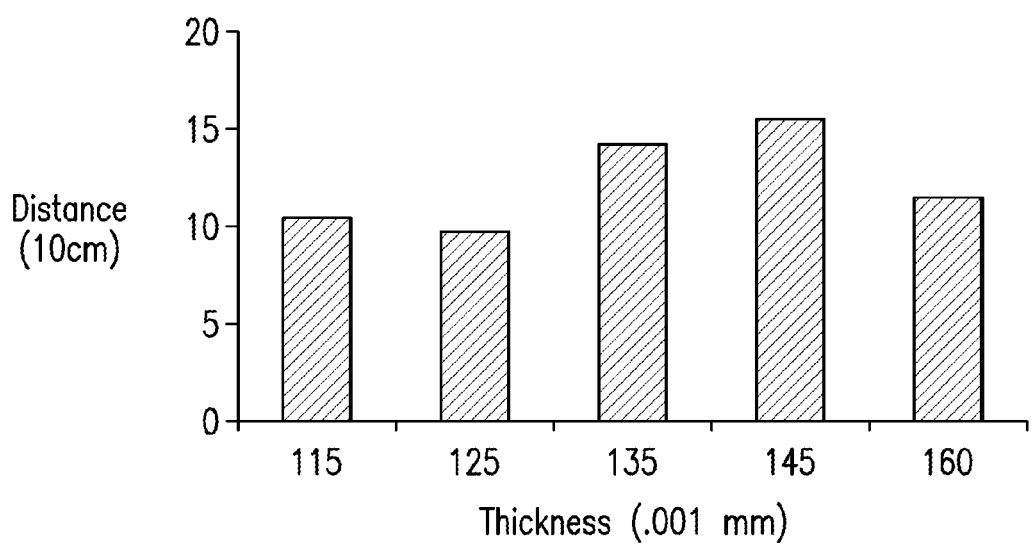
FIG. 11 is a bar chart showing the average launch distance attained with five popper lids, each having a different thickness.

FIG. 11 depicts the launch distance data into a bar chart. As can be seen, the thicker popper lids provided the longer distance. The longest average launch distance was attained with the 0.145 mm popper lid.

C. Trajectories

Trajectories were observed for a number of trial, and were recorded for the 0.145 and 0.160 mm thickness popper lids (results not shown). The trajectories were fairly similar within a popper lid, while the direction varied. However, the thickest popper lid produced the highest launch angle. Accordingly, it may be possible to attain further distances by adjusting the angle of the launching station depending on the thickness of the popper lid.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. An interactive lid for a package, the lid comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid.

2. The interactive lid of claim 1, further comprising at least one launching station for placement of an object to be launched or propelled from the lid.

3. The interactive lid of claim 1, wherein the entire shell is reversibly deformable.

4. The interactive lid of claim 2, wherein at least one region of the shell is reversibly deformable and contains the launching station.

5. The interactive lid of claim 2, wherein one or more of the launching stations comprises a shape that is complementary to an object to be launched or propelled.

6. The interactive lid of claim 4 wherein in their undeformed shapes, the launching stations are flush to the surface of the shell, are indented into the surface of the shell, or extend outward from the surface of the shell.

7. The interactive lid of claim 1, wherein the time required for the reversibly deformed shell or region thereof to spring back to an undeformed state is between about 1 and about 30 seconds.

8. The interactive lid of claim 1, wherein the time required for the reversibly deformed shell or region thereof to spring back to an undeformed state is variable.

9. The interactive lid of claim 1, wherein the object for launching is a food item.

10. The interactive package lid of claim 9, wherein the food item is a human snack food or an animal treat.

11. The interactive lid of claim 1, further comprising a sealing component that affixes the lid to a container containing items that can be launched from the lid.

12. The interactive lid of claim 11, wherein the sealing component is adapted to snap on, screw on, or press on to the container.

13. The interactive lid of claim 1, further comprising hardware for sound output, light output, or a combination thereof.

14. The interactive lid of claim 13, wherein the sound output, light output, or combination thereof are activated when the shell is reversibly deformed.

15. The interactive lid of claim 1, further comprising a container to which the interactive lid is removably attached.

16. A package comprising:
a) an interactive lid comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid; and
b) a container adapted to receive the interactive lid and comprising a plurality of items suitable for launching from the interactive lid, wherein the container optionally comprises a temporary closure sealing the container and securing the plurality of items.

17. The package of claim 16, wherein the plurality of items include food items.

18. A kit that includes:
a) a package comprising:
i. an interactive lid comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid; and
ii. a container adapted to receive the interactive lid and comprising a plurality of items suitable for launching from the interactive lid, wherein the container optionally comprises a temporary closure sealing the container and securing the plurality of items; and
b) one or more of instructions for use of the kit components, safety information related to the kit or its use, and information directing a user of the kit to a source of additional information.

19. The kit of claim 18, further comprising one or more refill containers adapted to receive the interactive lid and comprising a plurality of items suitable for launching from the interactive lid, wherein the containers comprise a temporary closure sealing the container and securing the plurality of items.

20. The kit of claim 18, wherein the plurality of items includes food items.

21. The kit of claim 20, wherein the food items are animal treats and the kit further includes information related to one or more of the health or wellness of an animal, and exercise or playful interactions with an animal.

22. A method for promoting the health or wellness of an animal comprising the steps of:
a) providing an interactive package lid adapted for launching a food product as part of an interactive play session with the animal, the interactive lid comprising a hollow body defined by a flexible shell, wherein the shell is reversibly deformable or comprises regions that are reversibly deformable, the lid adapted for launching or propelling an item when the item is placed on the shell or on a reversibly deformable region of the shell, wherein when the shell is deformed and thereafter springs back to its undeformed shape, the springing action propels the item away from the lid;
b) providing instructions or information on using the interactive lid for launching or propelling the food product; and
c) optionally, promoting the interactive lid for use in launching or propelling a food product, improving the health of an animal, improving a relationship with an animal, or having an interactive play session with an animal.

23. The method of claim 22, further comprising the step of providing a food product capable of being launched or propelled with the interactive lid.

* * * * *